(12) United States Patent
Wells

(10) Patent No.: US 6,338,141 B1
(45) Date of Patent: *Jan. 8, 2002

(54) METHOD AND APPARATUS FOR COMPUTER VIRUS DETECTION, ANALYSIS, AND REMOVAL IN REAL TIME

(75) Inventor: Joseph W. Wells, Newbury Park, CA (US)

(73) Assignee: CyberSoft, Inc., Conshohocken, PA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/163,251

(22) Filed: Sep. 30, 1998

(51) Int. Cl.⁷ ................................................ H02H 3/05
(52) U.S. Cl. ............................ 713/200; 714/28; 714/54
(58) Field of Search ........................... 713/200; 714/38, 714/33, 25, 28, 36; 705/54; 709/219; 380/4

(56) References Cited

U.S. PATENT DOCUMENTS

| | | | |
|---|---|---|---|
| 5,144,659 A | * 9/1992 | Jones | 380/4 |
| 5,319,776 A | 6/1994 | Hile et al. | 395/575 |
| 5,452,442 A | 9/1995 | Kephart | 395/183.14 |
| 5,483,649 A | * 1/1996 | Kuznetsov et al. | 395/186 |
| 5,485,575 A | 1/1996 | Chess et al. | 395/183.14 |
| 5,537,540 A | * 7/1996 | Miller et al. | 395/183.14 |
| 5,613,002 A | * 3/1997 | Kephart et al. | 380/4 |
| 5,623,600 A | 4/1997 | Ji et al. | 395/187.01 |
| 5,696,822 A | * 12/1997 | Nachenberg | 380/4 |
| 5,826,013 A | 10/1998 | Nachenberg | 395/186 |
| 5,832,208 A | 11/1998 | Chen et al. | 395/187.01 |
| 5,918,008 A | * 6/1999 | Togawa et al. | 395/186 |
| 5,948,104 A | * 9/1999 | Glack et al. | 713/200 |
| 5,951,698 A | * 9/1999 | Chen et al. | 714/38 |
| 5,960,170 A | * 9/1999 | Chen et al. | 395/183.14 |
| 6,006,329 A | * 12/1999 | Chi | 713/200 |
| 6,016,546 A | * 1/2000 | Kephart et al. | 713/200 |

* cited by examiner

Primary Examiner—Norman Michael Wright

(57) ABSTRACT

A method and apparatus for detecting computer viruses comprising the use of a collection of relational data to detect computer viruses in computer files. The collection of relational data comprises various relational signature objects created from viruses. Computer files, as they are checked for viruses, are run through a process to create those relational signature objects. Those objects created from the file are then checked against the collection of relational data. Depending on the results, the file may be infected and prohibited from running on the system. The method may be performed on a single, stand-alone computer system in real time, as well as a networked machine.

7 Claims, 7 Drawing Sheets

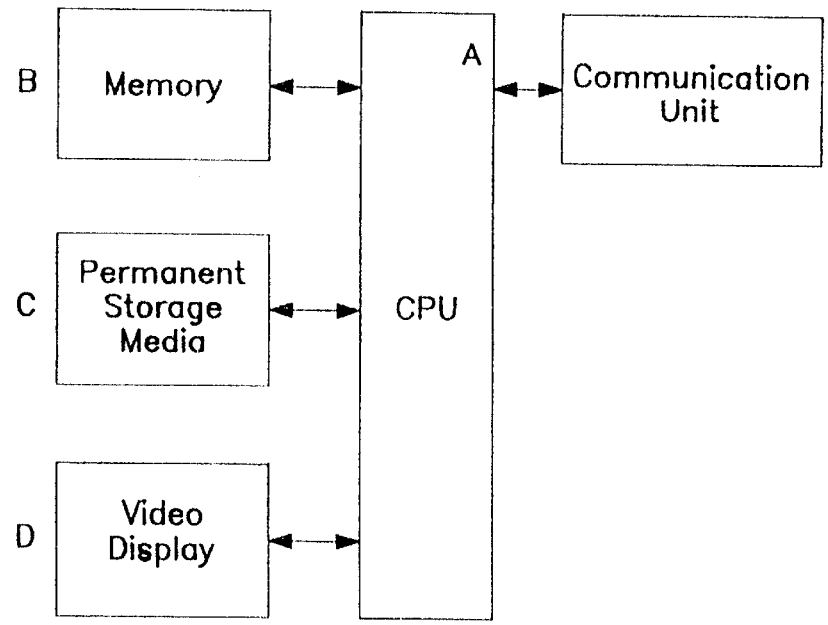
FIG. 1
PRIOR ART
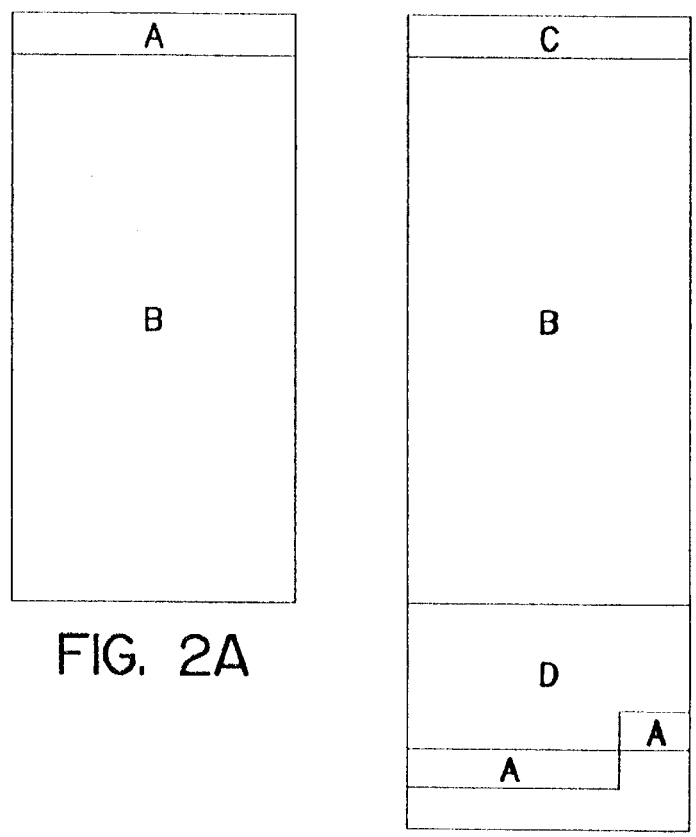
FIG. 2A
FIG. 2B

Allocated ByteStreams
ByteStreams are allocated. The pointer unit in each primary signature object points to these streams.

| Trace Object ByteStream |

| Opcode Object ByteStream |

| OpMode Object ByteStream |

| Entry Object ByteStream |

| Header Object ByteStream |

| Extra Object ByteStream |

| Tail Object ByteStream |

FIG. 6

Structure of each primary signature object.

| Pointer to ByteStream |

| N1 = Len of ByteStream |

| N2 = (Len of ByteStream)/N |

| CRC of ByteStream for N1 bytes |

| CRC of ByteStream for N2 bytes |

FIG. 7

Extended Relational Signature Objects: Variables

| |
|---|
| FileSize |
| Inset |
| MainEntry |
| AltEntry |
| Opcount |
| IterationCount |
| JumpCount |
| NoiseLevel |
| FileType |
| FileCRC |

FIG. 8

Extended Relational Signature Objects: Arrays

| |
|---|
| OpMap is a 32-byte bit map |

| |
|---|
| IterationMap is a variable length array of unsigned longs. |

| |
|---|
| ModifiedByteMap is a variable length array of bytes. |

FIG. 9

Extended Relational Signature Objects: Flags

| 0x00 — VerifiedType | File type is known. |
|---|---|
| 0x01 — MuTheta | File starts with "M" theta. |
| 0x02 — ZetaMu | File starts with "ZM". |
| 0x03 — FarCall | File has a far call (0x9A). |
| 0x04 — Op386 | File has 80386+ instructions. |
| 0x05 — OpInvalid | File has invalid opcode. |
| 0x06 — OpEsc | File uses ESC (coprocessor) instruction. |
| 0x07 — LoopBack | File has decryptor-like loop. |
| 0x08 — CallNext | File uses call-next, pop sequence. |
| 0x09 — HiBoundExit | File traces past EOF. |
| 0x0A — LoBoundExit | File traces to before start of file. |
| 0x0B — RetFar | File has retf instruction. |
| 0x0C — RetNear | File has ret instruction |
| 0x0D — ModByte | File has self-modifying code. |
| 0x0E — IntByte | File calls interrupt. |
| 0x0F — XHead | File has Win or OS/2 header. |

FIG. 10

METHOD AND APPARATUS FOR COMPUTER VIRUS DETECTION, ANALYSIS, AND REMOVAL IN REAL TIME

This invention relates to a stand-alone computer process that uses a single information engine to produce a collection of relational data which performs any, or all, of four operations involved in the detection of various types of computer viruses in real time. These four operations are (1) system integrity checking, (2) known virus detection, (3) unknown variant detection, and (4) new virus analysis and detection.

This relational anti-virus engine is referred to hereinafter as RAVEN.

Depending on the virus type, the relationship of about 70 different data items can be used in detection. The entire process is performed on a single, stand-alone computer system in real time. However, the process can also be run from on the stand-alone system from a connected, remote computer system, which remote system can maintain the known virus databases.

BACKGROUND OF INVENTION

The Field of the Invention

The invention relates in general to computer systems. In particular this invention relates to the detection of computer viruses. Primarily those viruses that execute on Intel and Intel-compatible processors under DOS, and versions of Microsoft Windows such as program viruses, boot sector viruses, and OLE viruses. However, the invention is specifically designed to be implemented on a wider variety of platforms (i.e. to be able to look for Intel-based viruses on systems with other processors).

Antivirus programs have been in existence since the late 1980s. An example of how traditional antivirus products work can be seen in a program written by this author in 1988. That program detected viruses and related hostile software in two ways: (1) It scanned each file for byte streams (this is called "signature scanning") matching known viruses and (2) it scanned each file for known virus-like code (this is called "heuristic scanning"). Other techniques in early antivirus programs involved either preventing virus-like activity (this is called "behavior blocking") or by checking a file for changes (this is called "integrity checking").

SUMMARY OF INVENTION

Raven is a single information engine, which gathers and uses a variety of relational data in order to perform four basic functions:

Gather, store, and compare information about computer system integrity.

Use the information supplied by analysis to detect known computer viruses.

Use the information supplied by analysis to detect variants of known computer viruses.

Automate computer virus analysis and output virus detection information.

These functions may be used independently, or as part of an overall antivirus development and updating process, or as part of a single, real-time process on a single computer system. The engine functions by analyzing the contents of a buffer. Usually, the buffer contains all or portion of a executable program file. The data extracted by the engine represents a unique complex collection of interrelated data based on the buffer's (file's) contents.

The unique features of this antivirus system are it's single-engine automation basis and its use of relational signature objects in virus detection.

In the case of known-virus detection, traditional approach was to use single, specific signature types to detect viruses—one virus, one signature. In contrast, Raven uses a large relational set of applicable data, (signatures and flags), to detect any given virus. Depending on the file type, the relationship of over 30 different "signatures" can be used to detect any single computer virus. So, for any given virus, a combination of many signatures and flags is used for precise identification. To our knowledge, the Raven system is unique. No other antivirus product we know of uses the combination and relationship of multiple signatures, signature types, and additional data to detect known viruses.

The core functionality of Raven involves gathering a specific data set from any given, recognized file type (technically, a stream type). The data set is used for different purposes; including file integrity management and virus detection. When used for virus detection the data represents a set of traditional and non-traditional signature types as well as heuristic flags and other information about the file.

It is the unique combination of this data, rather than any single data item (such as one single virus signature) that is used by Raven to detect viruses. How these different data relate to one another accounts for the "relational" nature of Raven.

Having multiple, usable signatures for each virus is advantageous. It allows Raven to verify infections with a high degree of certainty and helps in the avoidance of false identifications. Although all of the relational data is available, not all of it is used in every case. Rather, a subset of specific critical data is often used. This allows Raven to maintain good verification, while also allowing it to easily recognize new variants of known viruses. Additionally, the data can be easily overridden or modified in various ways to enhance performance. Generally, however, the data are never modified. In fact, most of the data is never touched, or even seen, by the developer, because the Raven detection system is built almost entirely by an automated system.

From its inception, Raven was specifically designed as part of an automated virus analysis and detection system. That is, the virus detection databases and updates are created as part of an automated virus analysis system. The purpose is to automate as much as possible the process of developing detection for new viruses as they appear. To this end, Raven is implemented in two distinct forms.

Raven is first implemented as part of a virus analysis tool. This tool is run on a large collection of viruses. The virus collection must meet certain criteria and have a known format. The output from the analysis-implementation of Raven is then input to a build system that, in turn, outputs a virus-detection database or update to be that is used by the second implementation of Raven.

Raven is implemented in this second form as part of a virus detection tool. When this tool is run on any given system (such as a user's system), the gathered data for each file checked is tested against the relational data that represents the known viruses stored in the virus-detection database. An exact match of all related data indicates a known virus is present. In addition, if most, but not all, of the data is matched, there is a high probability that an unknown (but closely related) virus is present.

While a few viruses may still need to be examined by a virus researcher, most are analyzed and accepted automatically. The automated system produces over 90 percent of the data sets used by Raven. The automated system allows for rapid response for new viruses.

Raven was specifically designed for portability. The core Raven functionality is written entirely ANSI C. This single antivirus engine that can be compiled and run on a variety of processors and operating systems. In addition, these different compiles of Raven all use the same virus-detection database. That is, copies of a single binary form of an original or update database may be used with compiles of Raven on different platforms.

BRIEF DESCRIPTION OF DRAWINGS

FIG. 1 is a block diagram of prior art consisting of a computer system upon which the Raven process might be implemented. The pictured system has a processor ("A") and memory ("B"). Additional parts of the pictured system (usually present) are one or more permanent storage media ("C"), one or more video displays ("D"), and (optionally) one or more communication or networking units ("E") connecting the computer to other computer systems.

FIG. 2A pictures an uninfected program file with the block marked "A" being the program's header and the block marked "B" representing the program's main body.

FIG. 2B pictures the same program file after being infected by an appending computer virus. The original (or host) program's body ("B") remains intact. The virus has added its own header ("C") to the host program, has attached its own body ("D") with the host's header ("A") stored therein. The virus header redirects the program flow so that its own code (in its main body marked "D") is run first.

FIG. 6 shows the allocated byte streams associated with the seven primary relative signature objects, which are filled in by the Raven process or the process calling the Raven process.

FIG. 7 shows the structure of each primary relative signature object.

FIG. 8 shows the extended relative signature variables.

FIG. 9 shows the extended relative signature arrays.

FIG. 10 shows the extended relative signature flags.

DETAILED DESCRIPTION OF PREFERRED EMBODIMENTS

Figure 3A:
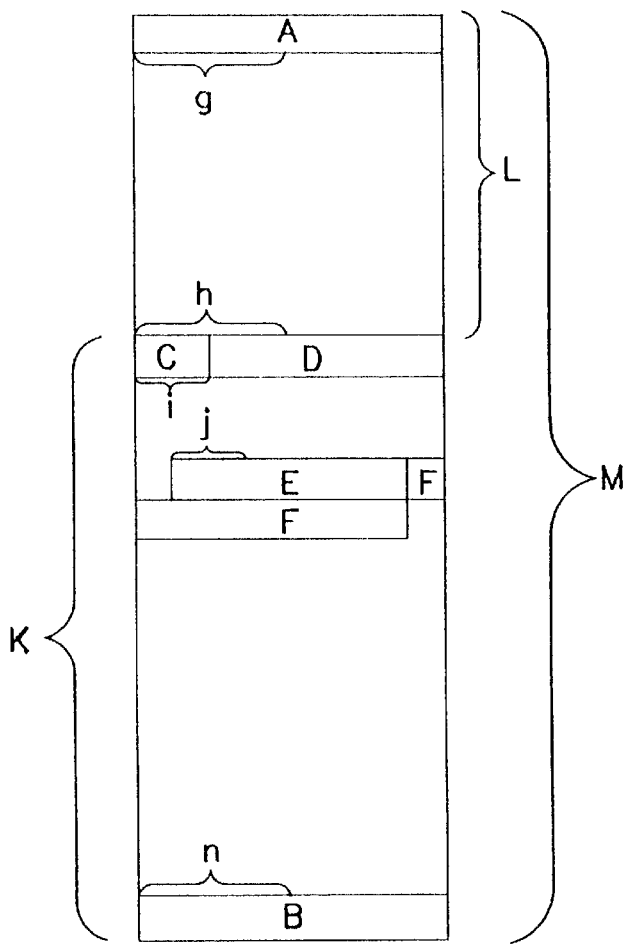
FIG. 3A pictures the critical parts of a program file that are stored for use by Raven when accessing any standard (non-OLE) buffer. "B" represents the end of the file. The header ("A") points to the beginning of the actual start of the program code ("C"). For the purpose of illustration, this program is shown as having a short portion of code ("C"), followed by a section of data ("D"). The first portion of code ("C") branches (or jumps) past the data and resumed execution as "E", "F", and beyond. The other designations ("G" through "M") are explained below under the heading "Description of Raven's Basic Relational Signature Objects."

Description of Raven's Primary Relational Signature Objects

Though other relational signatures and flags are used by Raven, the primary functionality of Raven involves seven primary relational signature objects.

Raven functions by tracing a program's path of execution. It does not emulate execution (e.g. it does not set up a virtual CPU and emulate each instruction), rather it interprets each instruction. As it traces through a buffer, it stores a variety of byte streams and modifies variables. The byte streams (along with their analysis data) constitute Raven's primary relational signature objects. The variables (including a system of flags) constitute Raven's extended relational signature objects.

When run on any given buffer, the Raven InfoEngine produces seven basic primary relational signature objects. Each primary relational signature object is created and stored by the Raven InfoEngine. The contents of each relational signature object depends on the basic relational signature object type.

In addition, each primary relational signature object contains five parts (or units). Since one unit (ByteStream) contains two overlapping byte signatures, the five units actually constitute six relational signature units.

Thus, any given set of seven primary relational signature objects (each containing six relational signature units) represents a unique set of 42 relational signature units.

The five units contained in each primary relational signature object are:

ByteStream (Includes ByteSubStream)
ByteStream Length
ByteSubStream Length
CRC of ByteStream
CRC of ByteSubStream Of five these units, only the "ByteStream Length" unit is predefined. All the units are variable depending on the unique contents of any given buffer. Note that the ByteStream unit includes a variable substring, ByteSubStream unit, and thus constitutes two relational signature units. In all, each basic relational signature object represents a collection of five unique relational signature unit.

The ByteStream unit represents a string of bytes (unsigned chars) copied from the file buffer. These bytes may or may not represent a contiguous byte stream found in the buffer.

Contained within the ByteStream unit is the ByteSubStream unit, which starts at the beginning of the ByteStream unit. That is, the first byte of both units are identical.

The ByteStream Length is preset before the object is filled in by Raven. It usually remains unchanged, but may be modified by Raven under unusual circumstances.

The ByteSubStream Length is, by default, the ByteStream Length halved. However, under certain conditions it may be smaller. Specifically, the ByteSubStream Length may be reset when a loopback condition is encountered (in the case of a decryption loop). In this way, the ByteSubStream Length will often reflect the length of a virus's decryption loop and thus exclude encrypted bytes beyond the loop from the signature.

The ByteStream CRC unit is a 16-bit CRC of the ByteStream from byte zero (the first byte) to ByteStream Length.

The ByteSubStream CRC unit is a 16-bit CRC of the ByteSubStream from byte zero (the first byte) to ByteSubStream Length.

The seven primary object types are:
Trace object
OpCode object
OpMode object
Entry object Header object
Extra object
Tail object

Explanation of the Seven Primary Objects

As explained above, each of these objects contain six relational signature units. An example of the location of each object and its units are illustrated in the drawings numbered 6 and 7. The following descriptions will reference this drawing.

The Trace object contains all the bytes found by Raven as it traces the path of execution in the buffer. Specifically, it contains all instructions (opcode, auxiliary, and data bytes) encountered. Branch instructions are stored and then the next instruction is taken from the location branched to.

Example. In the illustration, it is assumed that the program execution starts at the beginning of block "C" and that there is a branch instruction at the end of block "C" that branches to the start of block "E". Therefore, the ByteStream unit would contain all the bytes in blocks "C" and "E" and the ByteSubStream would contain all the bytes in blocks "I" and "J" as a subset of ByteStream.

The OpCode object contains all the opcode bytes found by Raven as it traces the path of execution in the buffer. Specifically, it contains only opcode bytes encountered. Branch opcodes are stored and then the next instruction is taken from the location branched to. No auxiliary or data bytes are stored.

Example. The ByteStream unit would contain only the opcode bytes in blocks "C" and "E" and the ByteSubStream would contain only the opcode bytes in blocks "I" and "J" as a subset of ByteStream.

The OpMode object contains all the opcode bytes, plus any auxiliary bytes (specifically bytes containing Mod, Reg, R/M data) found by Raven as it traces the path of execution in the buffer. Specifically, it contains only opcode bytes encountered. Branch opcodes are stored and then the next instruction is taken from the location branched to. No data bytes are stored.

Example. The ByteStream unit would contain only the opcode and auxiliary bytes in blocks "C" and "E" and the ByteSubStream would contain only the opcode and auxiliary bytes in blocks "I" and "J" as a subset of ByteStream.

The Entry object contains the number of bytes defined in ByteStream that are found by Raven at the start of the path of execution in the buffer. Specifically, it contains all instructions (opcode, auxiliary, and data bytes) encountered. Branch instructions are stored, but the next instruction is taken without tracing the branch.

Example. Since the branch at the end of "C" is not traced, the ByteStream unit would contain all the bytes in blocks "C" and "D" and the ByteSubStream would contain all the bytes in blocks "H" as a subset of ByteStream.

The Header object contains the number of bytes defined in ByteStream that are found by Raven at the start of the buffer. Specifically, it contains all bytes encountered. Note that this information is only rarely used in the detection of known viruses, but is always used by the integrity checking system.

Example. The ByteStream unit would contain all the bytes in blocks "A" and the ByteSubStream would contain all the bytes in blocks "G" as a subset of ByteStream.

The Extra object is only used where there is an extra header in the buffer (specifically headers used under the various Microsoft Windows operating systems) This object contains the number of bytes defined in ByteStream that are found by Raven at the start of the extra header. Specifically, it contains all bytes encountered. Note that this information is only rarely used in the detection of known viruses, but is always used by the integrity checking system.

Example. This object is not illustrated.

The Tail object contains the number of bytes defined in ByteStream that are found by Raven at the end of the buffer. Specifically, it contains all bytes encountered.

Example. The ByteStream unit would contain all the bytes in blocks "B" and the ByteSubStream would contain all the bytes in blocks "N" as a subset of ByteStream.

Structure of the Primary Signature Objects

As illustrated in drawing 6, allocated byte streams are used to store each actual primary signature object's ByteStream. These are actually stored as a pointer unit in each object. The bytestreams are pictured as being of various lengths because a different number of bytes is stored in each. For example, if X number of opcodes was traced, then the OpCode bytestream will contain N bytes, the OpMode bytestream will contain N+X bytes where X is equal to the number of opcodes with an auxiliary byte, and the Trace bytestream will contain all the bytes making up the complete instructions represented by N opcodes. The sizes of the Entry, Header, and Tail bytestreams are fixed. The size of the Extra bytestream is based on the size of the file's extended file header.

Each primary signature object has the structure shown in drawing 7.

Primary Relational Signature Objects and OLE2 Files

When an OLE2 file is being processed. Each of the primary objects are used to store information about a specific macro. Unused objects are zeroed out. If more than seven objects are needed, additional ones are allocated. The information stored in the ByteStream depends on the OLE2 file type.

Figure 3B:
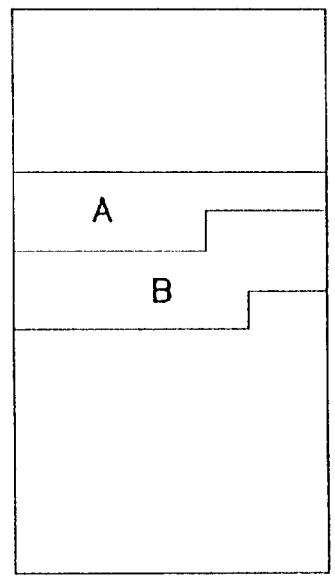
FIG. 3B pictures the critical parts of a WordBasic file that are stored for use by Raven. "A" and "B" are macros in WordBasic.

For WordBasic macros, a compressed copy of the macro is stored. The compression algorithm removes variable instructions in WordBasic (such as different ways of identifying spaces and tabs, which may change within the macro depending on the way a given copy of Microsoft Word is set up). The ByteStream Length is then the size of the compressed macro and the ByteSubStream Length is half this. This is illustrated in FIG. 3B, where "A" and "B" are macros in WordBasic.

Figure 3C:
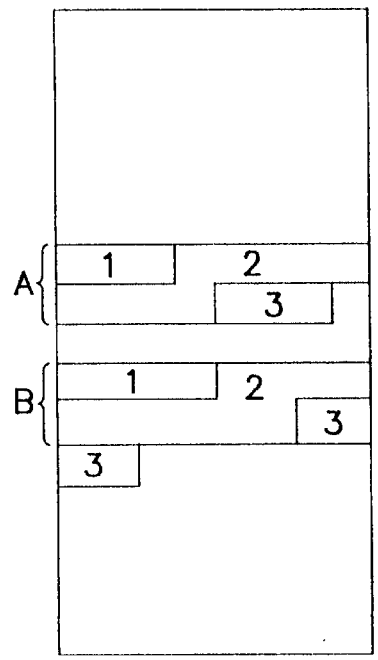
FIG. 3C pictures the critical parts of a VBA (Visual Basic for Applications) file that are stored for use by Raven. "A" and "B" represent the information for two macros. The "1" in each is the line table, "2" is the macro instructions, and "3" is the compressed source. "C" represents the global string table where macro variable names are stored.
Figure 4:
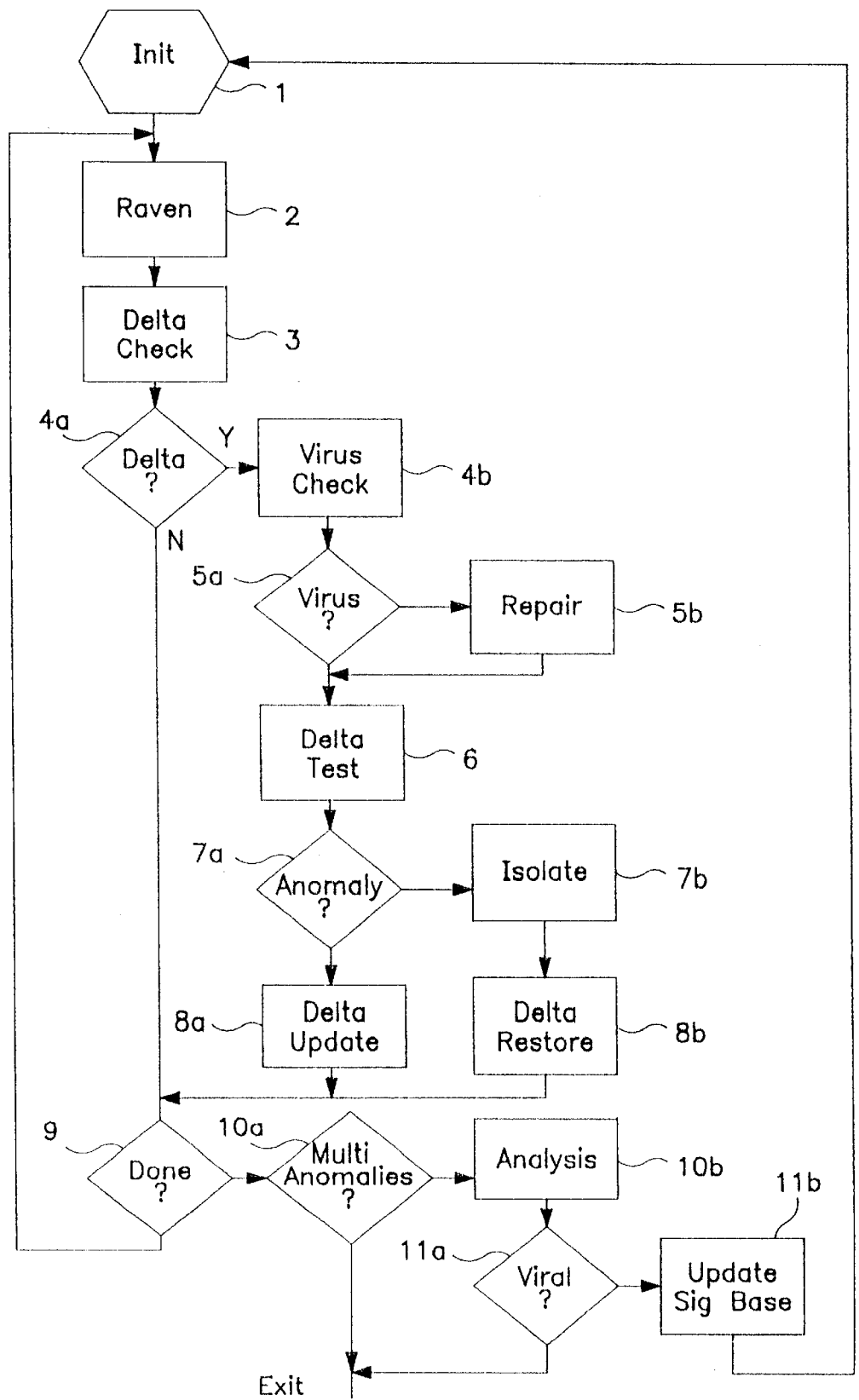
FIG. 4 shows an overview of the preferred embodiment of the process. This is detailed under the section heading "Main Process Description."

In the case of VBA macros, the data stored is constructed from information gleaned from each VBA project's line table, code, compressed source, and the global string table. In this case the ByteStream Length is then the size of the constructed data and the ByteSubStream Length is half this. This is pictured in FIG. 3C where "A" and "B" represent the information for two macros and "1" in each is the line table, "2" is the macro instructions, and "3" is the compressed source. "C" represents the global string table where macro variable names are stored.

Description of Raven's Extended Relational Signature Objects

In addition to Raven's primary relational signature objects, it also uses a set of extended relational signature objects. These objects may be a variable, array, or bit flag.

Variables

Variables are illustrated in FIG. 8.

FileSize

Inset

MainEntry

AltEntry

OpCount

IterationCount

JumpCount

NoiseLevel

FileType

FileCRC

The FileSize variable represents the size of any given file. It is rarely used in the detection of known viruses, but is always used by the integrity checking system. This variable is illustrated in drawing 3A as "M".

The MainEntry variable represents the distance in any given file from the start of the file to the location where program execution actually begins. It is rarely used in the detection of known viruses, but is always used by the integrity checking system. This variable is illustrated in drawing 3A as "L".

The Inset variable represents the distance in any given file from the location where program execution actually begins to the end of the file. It is very often used in the detection of known viruses (in fact it often equals the virus's size in bytes), it is also used by the integrity checking system. This variable is illustrated in drawing 3A as "K".

The AltEntry variable represents the distance in any given file from the start of the file to the location of an extra header (as in the case of Windows executables). It is rarely used in the detection of known viruses, but is always used by the integrity checking system. Note that in the case of DOS device drivers, this variable represents the location of the program's interrupt routine, while the MainEntry variable represents the location of the program's strategy routine.

The OpCount variable represents the number of instructions successfully interpreted.

The IterationCount variable represents the number of times a loopback instruction was encountered.

The JumpCount variable represents the number of times a branch instruction was encountered.

The NoiseLevel variable represents the number of common "noise bytes" that were encountered. Note that "noise bytes" are instructions that do nothing, which are often used in the variable decryption routines of polymorphic viruses.

The FileType variable represents the type of file being analyzed. This variable is set if the type of file can be verified (e.g. .EXE, device driver, OLE2).

The FileCRC variable represents a cryptographic checksum of the entire file. This variable is only generated when initializing the integrity checking database or when verifying repairs to a file.

Arrays

Arrays are illustrated in FIG. 9.

OpMap

IterationMap

ModifiedByteMap

Figure 5:
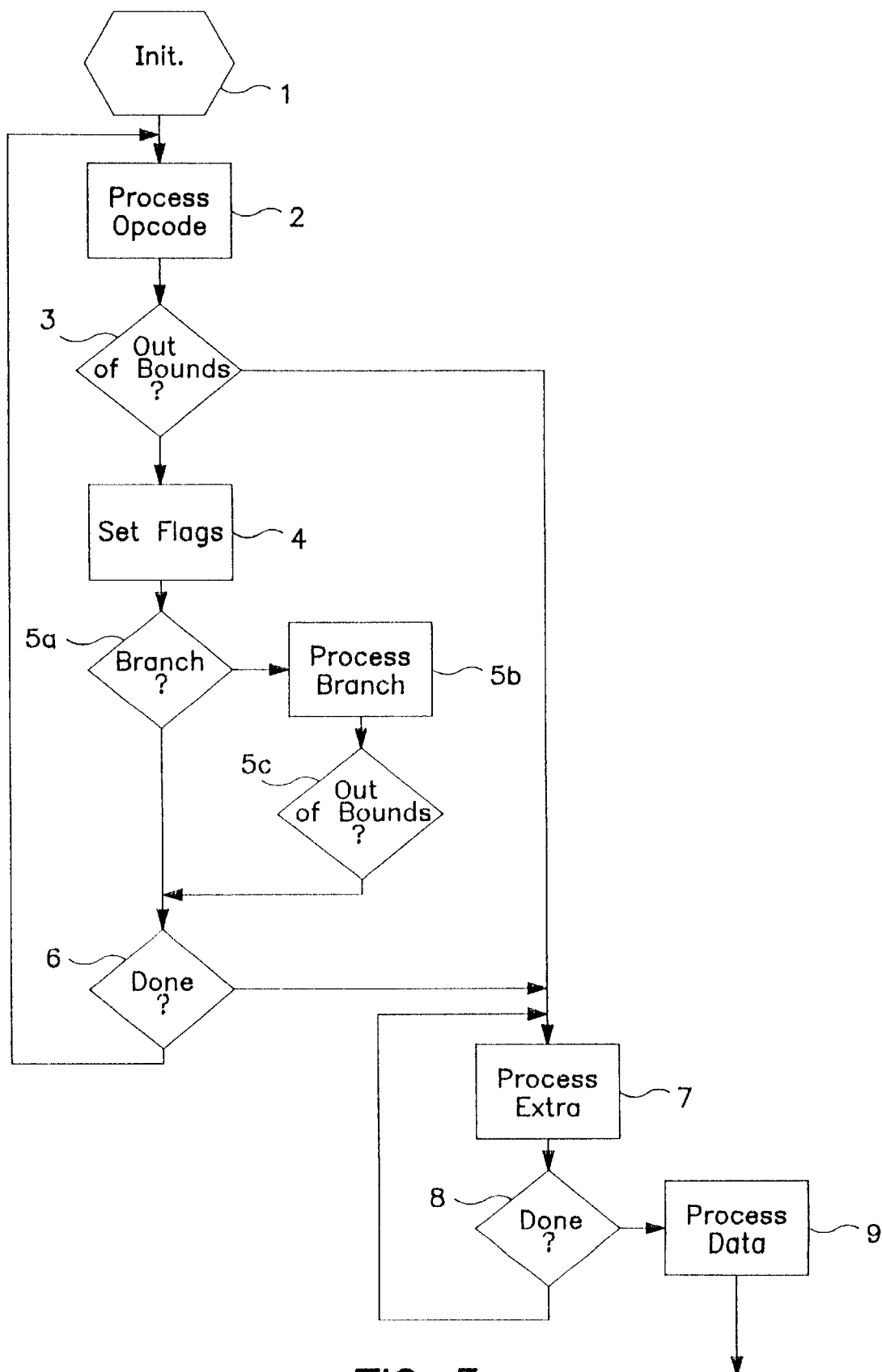
FIG. 5 shows the flow within the main information engine. This is detailed under the section heading "Raven Process."

The OpMap is a 32-byte bit array. Each bit represents a basic opcode. As any given opcode is encountered, the corresponding bit is set. Note that this process represents opcodes found in both the "Process OpCode" and "Process Extra" blocks in FIG. 5. As noted in section 5, more opcodes are processed than those represented in the OpCode object's ByteStream unit.

The IterationMap stores the locations (addresses) of instructions executed more than once.

The ModifiedByteMap stores an array of bytes that the interpreter code determines are being modified during execution. The bytes are stored as a stream in their modified form.

Bit Flags

Bit flags are illustrated in FIG. 10.

VerifiedType

MuTheta

ZetaMu

FarCall

Op386

OpInvalid

OpEsc

LoopBack

CallNext

HiBoundExit

LoBoundExit

RetFar

RetNear

ModByte

IntByte

XHead

The VerifiedType flag is set when the file is a known type.

The MuTheta flag is set when a file starts with an "M" followed by a jump instruction.

The ZetaMu flag is set when a DOS .EXE file starts with "ZM" rather than "MZ".

The FarCall flag is set when a far call instruction is encountered.

The Op386 flag is set when an instruction is encountered that is used in 80386 of later processors.

The OpInvalid flag is set if an invalid opcode is encountered.

The OpEsc flag is set if a coprocessor ESC instruction is encountered.

The LoopBack flag is set if an instruction is encountered that loops back.

The CallNext flag is set if an instruction is encountered that calls the next instruction, which is a POP instruction.

The HiBoundExit flag is set if tracing goes past the end of the file.

The LoBoundExit flag is set if the tracing goes backward past the start of the file.

The RetFar flag is set when a RetF instruction is encountered.

The RetNear flag is set when a Ret instruction is encountered.

The ModByte flag is set when an instruction is encountered that modifies other bytes in the file.

The IntByte flag is set when an interrupt instruction is encountered.

The XHead flag is set when a file is found to have an Extra Header.

Main Process Description

Step 1. Initialization

The detection and repair system is initialized by setting up the necessary Information structure and loading the necessary databases. If a DeltaBase (file integrity database) does not exist, one is created.

Note: the following steps are performed for each designated file on a system. A designated file is one which is defined as such by the user (e.g. all the .COM files on drive D:).

Step 2. Raven (See FIG. 5 for details)

Raven is run on the file and the Information structure is filled in.

Step 3. Delta Check

The Raven information is checked against the DeltaBase entry for the file.

Step 4a. Delta Test

If the Information structure does not match the entry, or there is no entry, the process moves to Step 3b. Note that is a new DeltaBase is being created, all files are processed through the virus scanner. If the Information structure matches an existing entry for the file then the process continues to Step 9.

Step 4b. Virus Check

The Information structure is tested against the database of known viruses.

Step 5a. Virus Test

If a known virus is detected, the process moves to Step 5b. Otherwise, the process moves on to Step 6.

Step 5b. Repair

If there is repair information on this virus, the virus is repaired.

Step 6. Delta Test

This function tests the results of the virus repair step (Step 5b) and the Information for both a file without a DeltaBase entry and for a changed file. For the last two, the heuristic flags in the Information structure are used to decide whether the changes (or a new file's characteristics) appear to be normal or anomalous. If it is a new file, it is flagged as suspect Step 7a. Anomaly Test If the file appears to be anomalous, the process moves on to Step 7b. Otherwise the process continues to Step 8a.

Step 7b. Isolate

The anomalous file is copied to an isolation directory and the number of anomalous files detected is incremented. Process proceeds to Step 8b.

Step 8a. Delta Restore

In the case of an anomalous change, the DeltaBase data is used to restore the original file. Note that the isolated copy of the file is not restored.

Step 8b. Delta Update

In the case of a new file (unless it was flagged as suspect) or a non-anomalous change, DeltaBase is updated with the new Information structure data.

Step 9. Done Test

If all files have been processed, or the user has terminated the scan, the process continues to Step 10a. If there are still files remaining the process returns to Step 2.

Step 10a. Multiple Anomalies

If multiple anomalies were detected and isolated then the process goes to Step 10. Otherwise the process ends.

Step 10b. Analysis

In multiple changed files that appear anomalous were detected, isolated and the originals successfully restored, then the isolated samples are analyzed as a group by using the Raven function in its analysis mode. This is the mode that is used to produce virus signatures. If usable Information-structure-based signatures are generated they are added to the virus detection database. The anomalous files are also analyzed by comparison to the original files (restored in Step 8b) and, if possible, repair information is generated and added to the virus repair database. Note that these samples and the new detection and repair information is archived in a form that may be sent to an antivirus vendor's virus analysis lab.

Step 11a. Viral Test

If a virus update was created by Step 10b, then the process goes to Step 11b. Otherwise the process exits.

Step 11a. Update Signature Database

The virus update created by Step 10b is added to the known virus signature database and the entire process (starting with Step 1) is restarted. This is done so that the system can be scanned with the new virus detection and repair information. If no update was created, the process ends.

Raven Process

Step 1. Initialize

For each file processed, local variables are initialized and a scalpel function is called to determine the file type and entry point.

Step 2. Process Instruction

The next assembly-language instruction pointed to is evaluated for validity. If it is invalid, an out-of-bounds condition is set. If it is valid, information about the instruction is stored. This involves: 1. Calculating the length of the opcode. 2. Setting various flags depending on the specific instruction. 3. Setting bits in the OpMap table. 4. Storing the opcode bytes, (i.e. (a) the opcode alone, (b) the opcode (and mod/rm byte if present), and (c) the full instruction) in the appropriate byte streams. 5. Increasing (incrementing or adding to) the appropriate counts. And 6. Resetting the assembly-language instruction pointer.

Step 3. Out-of-bounds Test 1

If the new assembly-language pointer is outside the buffer area, either the LoBoundExit flag or the HiBoundExit flag is set and the process, or if an out-of-bounds condition is set from the previous step then the OpInvalid flag is set and the process moves on to Step 7. Otherwise the process continues to Step 4.

Step 4. Set Flags

Depending on the specific opcode and flags set in 2 above, flags are set in the Information Structure.

Step 5a. Branch Test

If the instruction is a branch (short jmp, near jmp, long jmp, ret, retf, near call, or far call) one or more flags may be set (depending on the branch type and or direction) and the instruction pointer is reset to the destination of the branch and the process moves on to Step 5b. Otherwise the process moves on to Step 6.

Step 5b. Out-of-bounds Test 2

If the new assembly-language pointer is outside the buffer area, either the LoBoundExit flag or the HiBoundExit flag is set and the process moves on to Step 7.

Step 6. Done Test 1

If the number of instructions processed do not yet equal the target number, the process loops back to Step 2. Otherwise the process moves on to Step 7.

Step 7. Process Extra

The next assembly-language instruction pointed to is evaluated for validity. If it is invalid, an out-of-bounds condition is set. If it is valid, information about the instruction is stored. Unlike Step 2, this involves only calculating the length of the opcode, setting bits in the OpMap table, and resetting the assembly-language instruction pointer.

Step 8. Done Test 2

If the number of instructions processed do not yet equal the target number, the process loops back to Step 7.

Step 9. Process Data

Local flags and variables are transferred to the Information Structure. CRC values are calculated for the various ByteStream and ByteSubStream units (including those filled in by the calling function) and these are stored in the Information Structure.

Process returns to the calling function with the Information Structure completely filled in.

OTHER EMBODIMENTS

Though a preferred embodiment has been described it should be recognized that, by various modifications, other embodiments of this invention may be implemented, For example, by using the Raven engine, the known-virus component (consisting of scanning files apart for an file-integrity system) with (or without) its related repair system could be developed as a stand-alone program. Conversely, also by using the Raven engine, the file-integrity and its related recovery system could be developed as a stand-alone program. These and other modifications to the preferred embodiment of raven are provided for by the present invention that is limited only by the following claims.

What is claimed is:

1. A computer system configured for the detection and removal of various types computer viruses in real time, said computer system comprising:
- a processing unit,
- a memory;
- a disk having at least one disk sector;
- a video output;
- a communications input; and,
- a communications output
  whereby at least one computer file, stored in at least one directory, is retained in said memory or on said disk;
- a process to produce a collection of relational data comprising virus signature objects which further comprises at least seven primary relational signature objects;
- a process that uses said collection of relational data to verify and remove known viruses from one or more files (or one or more disk sectors) on the computer;
- a process to access relational data on the storage device, said process having the functionality to both read and write the data; and
- a process to output information to either or both of said video output and said connection output.

2. A computer system as in claim 1, wherein said system is configured to use the relational data process to produce new virus analysis for detection that can be transferred for use by a second system wherein said second system is configured to use the relational data process to detect known viruses, having one or more databases containing previously produced relational data for one or more known computer viruses, detecting the viruses by analyzing the relationship between any or all of the processed data for any given file (or one or more disk sectors) and any or all of the processed data for known viruses.

3. A computer system as in claim 1, wherein said system is configured to use the relational data process to produce new virus analysis for detection that can be transferred for use by a second system wherein said second system is configured to use the relational data process to detect minor variants of known viruses, having one or more databases containing previously produced relational data for one or more known computer viruses, detecting the viruses by analyzing the relationship between any or all of the processed data for any given file (or one or more disk sectors) and any or all of the processed data for known viruses.

4. The computer system in claim 1, wherein said system is configured to use the relational data process to produce, store, and compare use integrity checking information for one or more of the files (or one or more disk sectors) on said computer system.

5. The computer system in claim 1, wherein said system is configured to use the relational data process to detect known viruses, having one or more databases containing previously produced relational data for one or more known computer viruses, detecting the viruses by analyzing the relationship between any or all of the processed data for any given file (or one or more disk sectors) and any or all of the processed data for known viruses.

6. The computer system in claim 1, wherein said system is configured to use the relational data process to detect minor variants of known viruses, having one or more databases containing previously produced relational data for one or more known computer viruses, detecting the viruses by analyzing the relationship between any or all of the processed data for any given file (or one or more disk sectors) and any or all of the processed data for known viruses.

7. The computer system in claim 1, wherein said system is configured, in the event of a known virus being detected, to use relational data process to invoke the known-virus verification and removal process for the specific virus detected.

* * * * *